United States Patent [19]

Kogen et al.

[11] Patent Number: 4,514,836
[45] Date of Patent: Apr. 30, 1985

[54] BRUSH CONTACT FOR PHONOGRAPH TONE ARM DYNAMIC STABILIZER

[75] Inventors: James Kogen, Evanston; C. Roger Anderson, Wilmette, both of Ill.

[73] Assignee: Shure Brothers, Inc., Evanston, Ill.

[21] Appl. No.: 462,671

[22] Filed: Jan. 31, 1983

[51] Int. Cl.³ .................................................. G11B 3/58
[52] U.S. Cl. ..................................... 369/74; 15/256.5; 369/247
[58] Field of Search ............................ 369/74, 72, 247; 15/256.5, 1.5 A, 1.5 R

[56] References Cited

U.S. PATENT DOCUMENTS

| | | | |
|---|---|---|---|
| 1,472,857 | 11/1923 | Swensen | 369/74 |
| 3,185,485 | 5/1965 | Brubaker | 369/74 |
| 4,131,284 | 12/1978 | Rangsby | 274/23 |
| 4,134,594 | 1/1979 | Post et al. | 369/74 |
| 4,198,056 | 4/1980 | Cooper | 369/244 |
| 4,275,888 | 6/1981 | Anderson et al. | 369/74 |

FOREIGN PATENT DOCUMENTS

| | | | |
|---|---|---|---|
| 1001015 | 1/1957 | Fed. Rep. of Germany | 369/244 |
| 1240577 | 7/1959 | France | 369/72 |
| 381470 | 3/1931 | United Kingdom | 15/1.5 A |

*Primary Examiner*—Steven L. Stephan
*Attorney, Agent, or Firm*—Allegretti, Newitt, Witcoff & McAndrews, Ltd.

[57] ABSTRACT

An improved brush contact for a phonograph tone arm dynamic stabilizer. The contact includes bristles on a base, with free ends fanned in an arc. A portion of the bristles contact a record surface. Lateral movement of the tone arm across the record pivots the bristles and base, bringing new bristles into contact with the record surface.

6 Claims, 5 Drawing Figures

BRUSH CONTACT FOR PHONOGRAPH TONE ARM DYNAMIC STABILIZER

BACKGROUND OF THE INVENTION

This invention relates to phonograph cartridge attachments. More particularly, this invention relates to an improved brush contact for the dynamic stabilizer of a phonograph cartridge.

In the phonograph cartridge industry before 1978, a device for damping unwanted vibration and simultaneously removing static electricity had long been sought. In 1978, Shure Brothers, Inc. introduced such a device in its V15 Type IV Cartridge, which is the subject of U.S. Pat. No. 4,275,888, issued on June 30, 1981 to Carl R. Anderson, et al. for a "Stabilizing and Static Removing Attachment For Phonograph Pickup Cartridge." As described in detail in this Anderson Patent (incorporated here by reference), a cartridge can be vibrationally stabilized and a phonograph record statically discharged by a device comprising a record-engaging, conductive brush; a biasing mass; a lever-mounted, conductive frame and frame-mounting bearings filled with a conductive, viscous fluid. As also described in the Anderson patent, at column 5, lines 6-15, and shown best in that patent's FIG. 10, the brush of this dynamic stabilizer has been formed in the shape of a broom, with a bundle of generally parallel bristles held together at one end by a clamp.

This brush arrangement has proven highly desirable. While the lateral damping ability of Anderson's dynamic stabilizer was not well understood in 1978, it is now believed a phenomenon of "locking" between the bristles and record grooves makes lateral damping possible. This locking occurs when the bristles, during record rotation, sort themselves into "V" shaped groups in record grooves. The locking results in interfiber friction of the bristles during lateral vibration. This friction affords the lateral damping of the cartridge.

The penetration and locking of the bristles in the grooves also results in effective record cleaning by the brush. In forming "V's", the bristles fan the record grooves, with some descending to the groove bottoms. So positioned, the bristles catch minute dust particles in the grooves and thereby prepare the grooves for the stylus.

In spite of these advantages, the Anderson brush is not perfection. Frequent cleaning of the brush is required. In addition, excess lateral force, as from manual error, causes the bristles to bend and possibly disengage from the groove, or cause side thrust on the stylus affecting the tracking of the stylus in the groove and increasing stylus and record wear.

SUMMARY OF THE INVENTION

A principal object of this invention is to provide a brush contact with a dynamic stabilizer which is an improvement over the prior art brush described in the Background Of The Invention.

More specifically, a principal object of this invention is to provide a brush contact for a dynamic stabilizer which both tracks record grooves and yet does so without skidding, and without presenting resistance to excess lateral force applied to the phonograph tone arm.

These and other objects and advantages are well provided by this invention. In principal aspect, the invention is a brush contact for a phonograph tone arm dynamic stabilizer. The contact comprises a bristle base, bristles, and mounting means. The bristles are mounted on the base. The free ends of the bristles are fanned in an arc about the base. The mounting means mounts the base to the dynamic stabilizer, and provides for pivoting of the base and bristles in response to force applied to the bristles in the plane of the arc. As the brush contact is so constructed, a portion of the bristles may be positioned to contact a record surface. Any excess force applied to the bristles in the plane of the arc, as through human contact with the tone arm, will pivot the base and bristles relative to the dynamic stabilizer. Bending and sliding of the bristles are so avoided, and another portion of the bristles are simultaneously positioned to continue contact with the record surface, without producing undesirable side forces on the stylus. This also affords the possibility of applying viscous damping to the pivot joint between bristle base and mounting means.

BRIEF DESCRIPTION OF THE DRAWING

The preferred embodiment of the invention is described below, with reference to the accompanying drawing. The drawing consists of five figures, each briefly described as follows.

DETAILED DESCRIPTION OF THE PREFERRED EMBODIMENT

Figure 1:
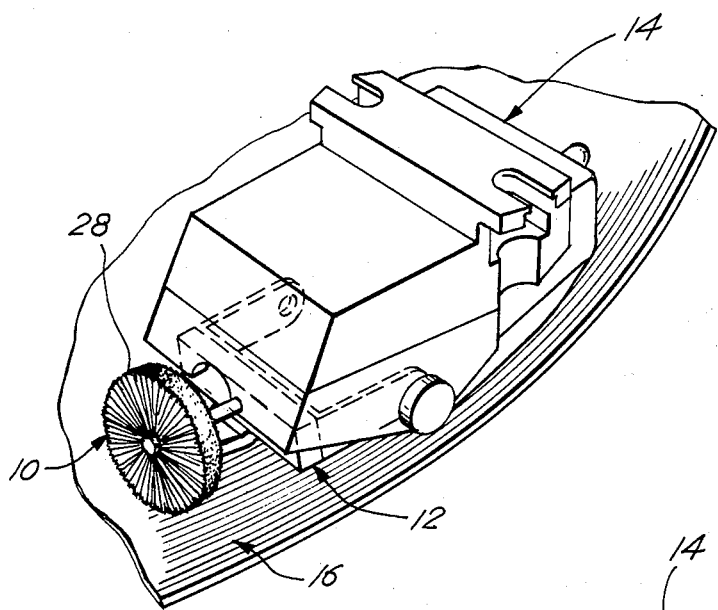
FIG. 1 is a perspective view of a phonograph cartridge on a record surface, with the cartridge having a dynamic stabilizer and a brush contact according to this invention.

Referring to FIGS. 1-5, the preferred embodiment of this invention is a brush contact 10 for a phonograph tone arm dynamic stabilizer or damper assembly 12 mounted on a phonograph cartridge 14. (For a complete description of the stabilizer, please refer to U.S. Pat. No. 4,275,888.) The contact 10 is for contacting a record surface 16. As seen by comparing FIGS. 2 and 5, the contact 10 may vary in size as desired.

Referring to FIGS. 2-5, a rod or axle 18 of the brush contact 10 extends outward, or forward, of the cross-piece 20 of the damper assembly 12. As most preferred, the axle 18 is externally threaded.

Figure 2:
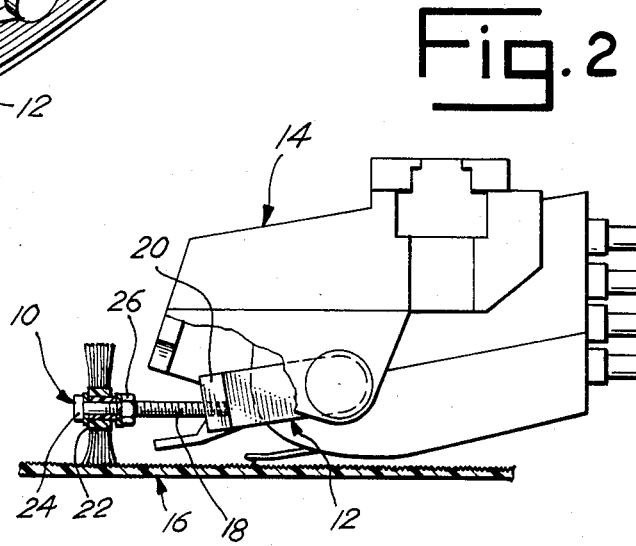
FIG. 2 is a side view of the cartridge of FIG. 1, with a portion broken away and the brush contact sectioned to reveal detail.

Referring to FIG. 2, a bristle base 22 is mounted on the outward, or forward, end of the axle 18. The base 22 is annular, and is mounted on the axle 18 for rotation about the longitudinal axis of the axle 18. A head 24 of the axle 18, and a nut 26 threaded onto the axle 18 rearward of the base 22, retain the base 22 on the axle 18. A suitable conductive fluid such as silicon fluid is applied between the base 22 and axle 18, to provide a constant mechanical resistance to rotation of the base 22 about the axle 18.

As should now be apparent, the axle 18 and associated elements comprise one possible form of a means mounting the base 22 of the damper assembly 12, for providing pivoting, and more especially, rotating, movement of the bristle base 22.

Referring to FIGS. 1 and 2, bristles 28 are mounted on the bristle base 22. As most preferred, and as shown best in FIG. 1, the bristles 28 have free ends fanned in a complete circle about the bristle base 22. As otherwise preferred, the bristles 28 may have free ends fanned in an arc of a circle, an ellipse or otherwise. While fanned, the bristles 28 are sufficiently packed, or sufficient in number that adjacent bristles are substantially parallel to each other. They are also sufficient in number that interfiber friction may occur among the bristles.

Figure 5:
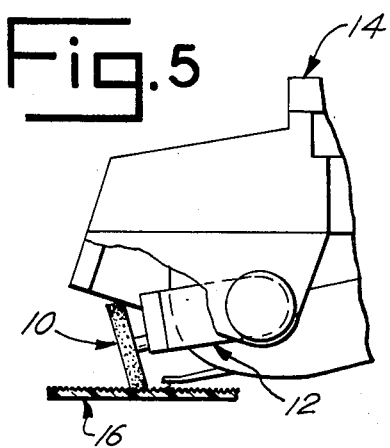
FIG. 5 is a partial side view of a cartridge having a dynamic stabilizer and smaller brush contact.
Figure 3:
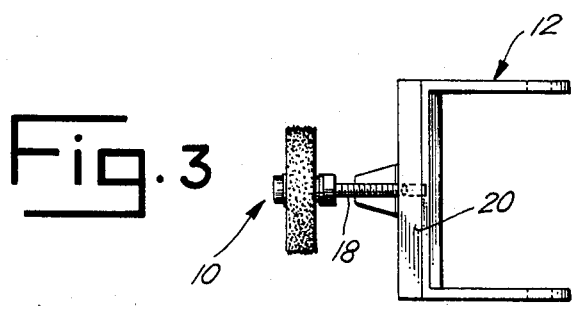
FIG. 3 is a top view of the stabilizer and brush contact of FIGS. 1 and 2.
Figure 4:
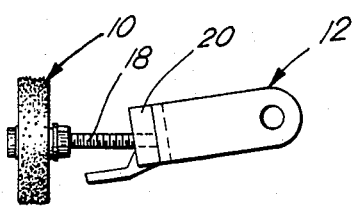
FIG. 4 is a side view of the stabilizer and brush contact of FIGS. 1-3.

As will be understood, a portion of the bristles 28 may be positioned as in FIGS. 1, 2 and 5 to contact a record surface 16. When placed in such contact, record-contacting bristles enter into and track the grooves of the record surface 16. The record-contacting bristles fan the record grooves, with some descending into and tracking the groove bottoms. The bristles sweep the record grooves free of minute particles, preparing the path of the phonograph stylus.

As desired, the bristles 28 may be rotated manually between records to engage new, cleaner bristles with a new record surface.

While the bristles are engaged in the grooves, should a force be applied to the record-contacting bristles in the plane of the arc through the tone arm cartridge and stabilizer assembly 12, as by human contact with the tone arm, or by effect of an off-center record record spindle opening, the bristles 28 and bristle base 22 pivot in response, about the axle 18. As the bristles 28 and base 22 pivot, new bristles come into contact with the record surface 16, and some bristles are removed from contact. Since the bristle ends are fanned in a complete circle, the bristles may be endlessly rotated, without loss of bristles properly positioned to contact the record surface. The low frequency lateral arm resonance is damped both by the interfiber friction and the viscous damping at the pivot.

The brush contact 10 may be formed of any suitable materials, but as preferred, the axle 18 is of steel, the base 22 of conductive plastic and the bristles 28 of carbon fiber.

The preferred embodiment is now described. The invention and the process of making and using it are also described in full, clear, concise and exact terms as to enable any person skilled in the art to make and use the same.

To particularly point out and distinctly claim the subject matter regarded as invention, the following claims conclude this specification.

What is claimed:

1. A phonograph cartridge assembly for playing a phonograph record, the record having a record surface with a record trace, the assembly comprising:
   a phonograph cartridge;
   a phonograph stylus carried on the phonograph cartridge, the stylus having a longitudinal extent which, while the stylus is on the record, is parallel to a tangent to the record trace, the stylus thereby defining a longitudinal direction in the direction of the longitudinal extent;
   a phonograph tone arm dynamic stabilizer mounted on the phonograph cartridge; and
   a brush contact for the phonograph tone arm dynamic stabilizer mounted on the stabilizer and including a bristle base, bristles mounted on the base and having free ends fanned in an arc about the base, the arc defining a plane of the arc, and means for mounting the bristle base to the stabilizer (a) for positioning the plane of the arc substantially transverse to the longitiudinal direction of the stylus, with the cartridge, stylus, stabilizer and brush contact being constructed, sized and arranged such that a portion of the bristle free ends may contact the phonograph record surface while the stylus tracks the record trace, and (b) for providing pivoting of the base and the bristles in the plane of the arc in response to some forces applied to the assembly in the plane of the arc such that another portion of the bristle free ends may contact the phonograph record surface while the stylus tracks the record trace.

2. A brush contact as in claim 1 in which the base is annular and the free ends of the bristles are fanned in a circle.

3. A brush contact as in claim 2 in which the mounting means includes an axle and the base is mounted on the axle for rotation about the axle.

4. A brush contact as in claim 3 in which the axle is mounted on the stabilizer.

5. A brush as in claim 1 further comprising means for damping the pivoting of the bristle base.

6. A phonograph cartridge assembly for playing a phonograph record, the record having a record surface with a record trace, the assembly comprising:
   a phonograph cartridge;
   a phonograph stylus carried on the phonograph cartridge, the stylus having a longitudinal extent which, while the stylus is on the record, is parallel to a tangent to the record trace, the stylus thereby defining a longitudinal direction in the direction of the longitudinal extent;
   a phonograph tone arm dynamic stabilizer mounted on the phonograph cartridge; and
   a brush contact for the phonograph tone arm dynamic stabilizer mounted on the stabilizer and including a bristle base, bristles mounted on the base and having free ends fanned in an arc about the base, the arc defining a plane of the arc, and an axle mounted on the stabilizer, the base being mounted on the axle for rotation of the base and the bristles about the axle in response to some forces applied to the assembly in the plane of the arc;
   the cartridge, stylus, stabilizer, brush and axle being constructed, sized and arranged such that the plane of the arc is substantially perpendicular to the longitudinal direction while the stylus is tracking the record trace and such that a portion of the bristle free ends contact the phonograph record surface while the stylus is tracking the record trace, and such that after pivoting of the base and the bristles in response to said forces another portion of the bristle free ends may contact the phonograph record surface while the stylus tracks the record trace.

* * * * *

UNITED STATES PATENT AND TRADEMARK OFFICE
CERTIFICATE OF CORRECTION

PATENT NO. : 4,514,836

DATED : April 30, 1985

INVENTOR(S) : James Kogen and C. Roger Anderson

It is certified that error appears in the above-identified patent and that said Letters Patent is hereby corrected as shown below:

On the title page;

In References Cited "Rangsby" should be --Rangabe--;

Column 3, line 27, delete second "record".

Signed and Sealed this

First Day of October 1985

[SEAL]

Attest:

Attesting Officer

DONALD J. QUIGG

Commissioner of Patents and Trademarks—Designate